United States Patent [19]

Hertzler

[11] 4,405,269
[45] Sep. 20, 1983

[54] CARTRIDGE CASE REFINISHING SET

[76] Inventor: Bruce Hertzler, Rt. 5 Box 5400, Albuquerque, N. Mex. 87123

[21] Appl. No.: 314,171

[22] Filed: Oct. 23, 1981

Related U.S. Application Data

[63] Continuation-in-part of Ser. No. 144,618, Apr. 28, 1980, abandoned.

[51] Int. Cl.$^3$ ................. B23B 51/08; B23B 51/12
[52] U.S. Cl. ................. 408/211; 408/226; 408/239 R; 29/1.32
[58] Field of Search ......... 408/238, 239 R, 713, 408/711, 226, 228, 231, 233, 211; 29/1.32; 279/1 A, 14, 83, 91

[56] References Cited

U.S. PATENT DOCUMENTS

| | | | |
|---|---|---|---|
| 458,408 | 8/1891 | Schwanhauser | 408/238 |
| 2,338,626 | 1/1944 | Emrick | 279/83 |
| 2,359,954 | 10/1944 | Whipple | 29/1.32 |
| 2,470,392 | 5/1949 | Gassman | 408/211 |
| 2,744,307 | 5/1956 | Smiley | 29/1.32 |
| 3,199,168 | 8/1965 | Rhine | 29/1.32 |
| 3,259,955 | 7/1966 | Strebler | 29/1.32 |
| 3,555,641 | 1/1971 | Lee | 29/1.32 |
| 3,595,107 | 7/1971 | Dackow | 408/211 |

Primary Examiner—Leonidas Vlachos
Attorney, Agent, or Firm—Walter R. Keller

[57] ABSTRACT

A complete set of mating tools to be powered by an electric motor, or a hand held drill, for use in deburring shell casings, reaming primer pockets and cleaning and polishing shell casings, said set of mating tools comprising an adapter barrel, an adapter sleeve, and a case spinning tool, and said set containing a burring tool and a primer pocket reamer.

2 Claims, 4 Drawing Figures

CARTRIDGE CASE REFINISHING SET

This is a continuation-in-part of application Ser. No. 06/144,618 filed on Apr. 28, 1980 and now abandoned.

BACKGROUND

1. Field of the Invention

This invention relates primarily to implements used to refinish spent cartridge cases, and more particularly to deburring, primer pocket reaming, and cleaning and polishing of the cartridge cases.

2. Description of Prior Art

This invention relates primarily to implements used to refinish spent cartridge cases, and more particularly to deburring, primer pocket reaming, and cleaning and polishing of the cartridge cases.

Primer pocket reaming also is generally done by hand, as is cleaning to remove dirt, grime, tarnish and powder residue from shell casings. J. W. RHINE, U.S. Pat. No. 3,199,168 provides a mechanized means of triming cartridge cases, using a pin which inserts into the cartridge to determine the length of the cartridge during the triming operation. For best accuracy, especially on used cartridge cases; however it is important to control the external length of the cartridge. SMILEY, U.S. Pat. No. 2,744,307 teaches using a bench lathe to power a cartridge case trimmer. SMILEY teaches a means for accurately sizing the inside diameter of the neck wall of the case. Again the limitation on the rate at which shell casings can be accurately trimmed by SMILEY are obvious.

SUMMARY OF THE INVENTION

This invention comprises an adapter barrel, an adapter sleeve, and a case spining tool, and provides a means for utilizing the usually hand held Wilson burring tool manufactured by L. E. WILSON, Inc., Casmere, Wash. 98825 and a primer pocket reamer also manufactured by L. E. Wilson, Inc. Both the burring tool and the primer pocket reamer are in extensive use throughout the United States, but the hand held operation is slow and tedious. Additionally, there is no fast means for cleaning spent cartridge cases, presently available to the average person who reloads ammunition. Very frequently, a perfectly reloaded shell will jam, fail to eject or otherwise malfunction because it has not been properly cleaned. Thus, it is an objective of this invention to provide the average reloading person with the capability of deburring, reaming the primer pocket and cleaning cartridges at a rate for exceeding his present capability, with a minimum of implements, all powered by readily available horse power sources. It is further an objective of this invention to provide a capability to rapidly refinish cartridge cases, to the average person at an economical price well within his means.

DESCRIPTION OF THE PREFERRED EMBODIMENT

Figure 1:
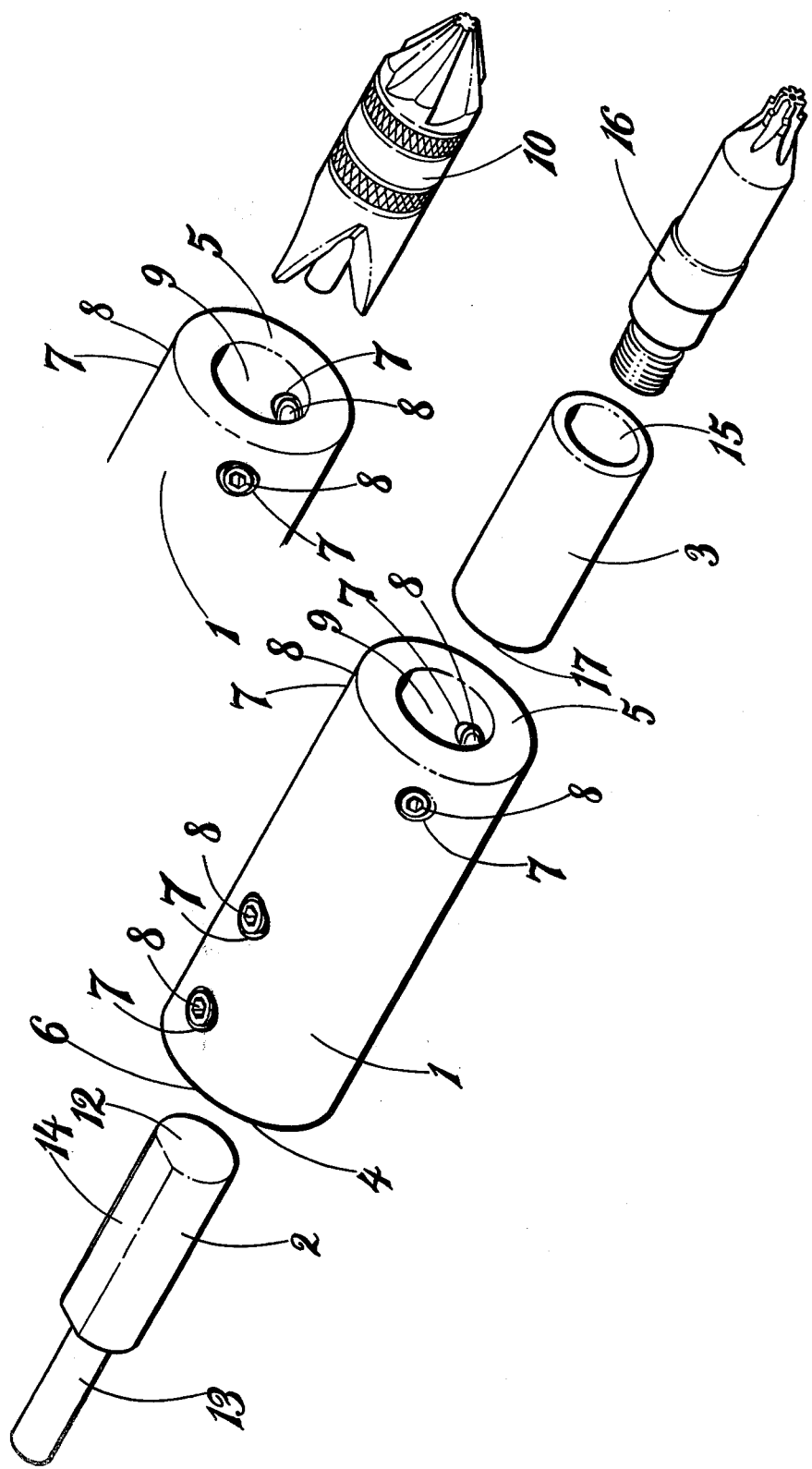
FIG. 1 is an expanded isometric view of the invention showing use of a burring tool and a primer pocket reamer.
Figure 2:
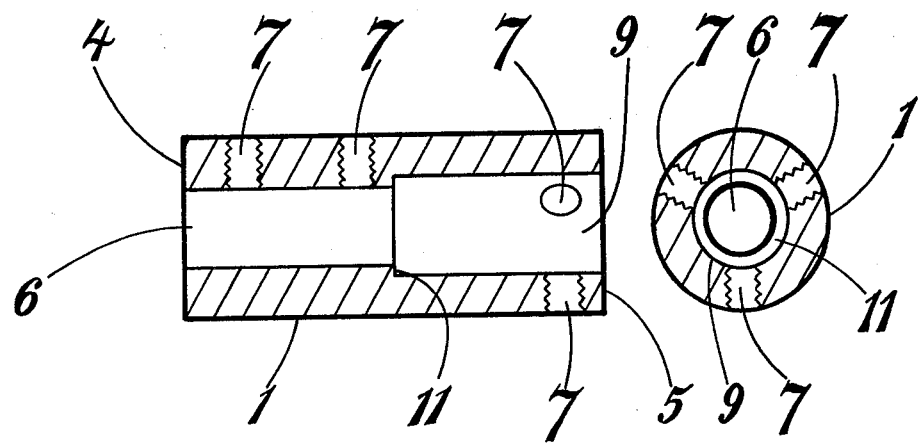
FIG. 2 is a crossectional view of an adapter barrel
Figure 3:
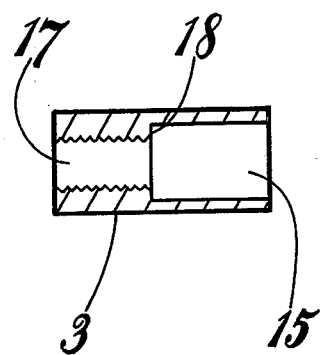
FIG. 3 is a crossectional view of an adapter sleeve
Figure 4:
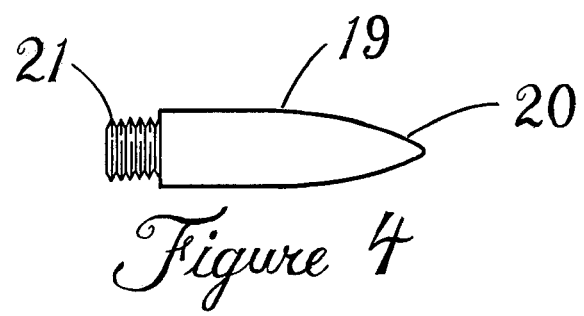
FIG. 4 is an isometric view of the cartridge spinning tool.

FIGS. 1 and 4 shows the invention to consist of an adapter barrel 1, an adapter sleeve 3, and a case spinning tool 19. The adapter barrel 1 is generally cylindrical in shape having a power end 4, and a tool end 5. FIG. 2 shows the adapter barrel 1 having a small cylindrical center bore 6 into the power end 4. This small cylindrical bore 6 is sized to slide onto a round electric motor shaft. While the invention can be made any size, it is noted that small electric motors commonly have half inch diameter shafts. The adapter barrel 1 has one or more tapped holes 7, which are threaded to accept Allen set screws 8, through the wall of the adapter barrel 1 into the small cylindrical bore 6. After the adapter barrel 1 is slid on to a motor shaft, the adapter barrel 1 can be secured thereto by tightening the Allen set screws 8. Usually a motor shaft has a flat provided, against which the Allen set screws 8 may bear. The tool end 5 of the adapter barrel 1 has a large center bore 9 sized to slideably accept a burring tool 10. The surface where the large center bore 9 and the small cylindrical center bore 6 meet, is designated a shoulder 11. The adapter barrel 1 has one or more tapped holes 7 which also are threaded to accept Allen set screws 8, through the wall of the adapter barrel 1 into the large center bore 9. The tapped holes 7 into the large center bore 9 are arranged circumferentially around the tool end 5. The burring tool 10 depicted, is manufactured by L. E. Wilson, Inc., Cashmere, Wash. 98825. The burring tool 10 is double-ended, meaning that one end is designed for deburring the inside of the neck of a cartridge, while the other end is designed for deburring the outside of the neck of the cartridge. Consequently the depth of the large center bore 9 to the shoulder 11 must be such that the burring tool 10 bottoms yet leaving the desired operating end sufficiently exposed; and the tapped holes 7 around the tool end 5 situated so that the Allen screws 8 bear in the middle of the burring tool 10, and not on the operative ends. Economics and commonality establishes that all tapped holes 7 be similarly sized, as well as the Allen set screws 8.

A primer pocket reamer 16 used with this invention is depicted in FIG. 1, and is also manufactured L. E. Wilson, Inc., Cashmere, Wash. 98825. The primer pocket reamer 16 is shown to have an operative end and a threaded end. FIG. 1 shows an adapter sleeve 3 has a center bore 15 sized to slide over and accept the primer pocket reamer 16 in one end. The other end of the adapter sleeve 3 has a tapped and threaded hole 17. The surface where the center bore 15 and the tapped and threaded hole 17 meet is designed a shoulder 18. The shoulder 18 is situated so that when the threaded end of the primer pocket reamer 16 is slid into the center bore 15 and then threaded into the tapped and threaded hole 17, the primer pocket reamer 16 is securely retained in the adapter sleeve 3, yet protrudes sufficiently to be functional.

FIG. 4 shows the case spinning tool 19 to have a conical section 20, and a stem 21. The stem 21 is cylindrical in shape sized to slideably mate into the adapter sleeve 3. The conical section 20 is conical in shape, the point being sharp enough to be partially inserted into the neck of a cartridge case. The conical section 20, and the stem 21 may be integrally formed, or they may be separately formed and rigidly attached to each other. The case spinning tool 19, when inserted in the adapter sleeve 3 which in turn is inserted into the adapter barrel 1 and the adapter barrel 1 is then affixed to a motor shaft, will rotate at the speed of the motor. A cartridge case is applied to the tip of the conical section 20 so that the neck of a cartridge case is placed over the tip. Friction then turns the cartridge case. The person who is to clean cartridge cases, holds in his hand a piece of steel wool, in which rests a cartridge case. The person then applies the cartridge, as aforestated, to the conical section 20. The cartridge case spins rapidly in the nest of steel wool, and the steel wool scours the cartridge case gleaming clean. It was previously thought that applying the neck of the cartridge case to the conical section 20 would enlarge the neck of the cartridge case. This turns out not to be the situation, since only a slight pressure against the conical section 20 is required. The conical section 20 may be made of steel, but also may be made of many other materials such as rubber, synthetic resins, and plastics.

With this invention, the person desiring to refinish cartridge cases, simply installs the adapter barrel 1 on the shaft of any convenient electric motor. Into the adapter barrel he installs the burring tool 10 with the internal deburring end exposed, and proceeds to internally deburr his cartridge cases. Having finished the burring tool 10 is removed from the adapter barrel 1, turned end for end and reinstalled on the adapter barrel 1, and the external portion of the neck of the cartridge cases deburred. The burring tool 10 is then removed from the adapter barrel 1, and the primer pocket reamer 16 installed in the adapter sleeve 3, which in turn is installed in the adapter barrel 1. The person refinishing the cartridge cases, thus proceeds to ream the primer pockets. Finally, the primer pocket reamer 16 is removed from the adapter barrel 1, and the case spinning tool 19 installed grasping a piece of steel wool, the person refinishing the cartridge cases, grasps each cartridge case in the steel wool, applies it to the case spinning tool 19, until the cartridge case is clean and bright. In a matter of an hour or so, thousands of cartridge cases can be refinished, ready to be re-loaded; in contrast to a hundred or so previously done by hand.

Because there are undoubtedly numerous people who reload cartridges but do not have access to a small electric motor, the invention is adaptable for use with a hand held small electric drill, which may or may not be mounted in a drill press FIG. 1 shows a drill shank 2 having an adapter end 12 and a drill end 13, both being generally ajindrical. The drill shank 2 is integrally made. The adapter end 12 is sized to slideably mate into the smaller cylindrical bore 6 of the adapter barrel 1, and the adapter end 12 has a flat 14 on which bear Allen set screws 8. The drill end 13 is generally lindrical in shape sized to be accepted into the chuck of a hand held drill, for example a quarter inch drill.

I claim:

1. A cartridge refinishing set for use on the shaft of an electric motor, said set comprising an adapter barrel, said adapter barrel being generally cylindrical in shape, and having a power end and a tool end, and wherein the adapter barrel has a small cylindrical bore in the power end, said small cylindrical bore being sized to slideably mate on the shaft of an electric motor, and wherein the adapter barrel has a large counter bore in its tool end, and wherein the surface formed where the large center bore and the small cylindrical bore is a shoulder and wherein the large center bore is sized to slideably accept a double ended burring tool, and the shoulder is situated so that when the burring tool is installed the operating end of the burring tool provides sufficiently, and the non-operating end is sufficiently inside the adapter barrel, and wherein the adapter barrel has a plurality of tapped holes from its external surface through the wall of the adapter barrel into the smaller cylindrical bore and into the large center bore, said tapped holes being threaded and sized to accept Allen set screws; and an adapter sleeve being generally cylindrical in shape and having an external diameter such that the adapter sleeve slideably inserts into the large cylindrical bore of the adapter barrel, and the adapter sleeve having in one end a center bore sized to slideably accept a primer pocket reamer of known construction, and the adapter sleeve having in the other end a tapped and threaded hole, which threadably and mateably will accept the threaded end of the primer pocket reamer; and a case spinning tool which has a conical section and a stem wherein the tip of the conical section is sufficiently sharp so that the neck of a cartridge may be applied over the tip, and the stem mates with the adapter sleeve; and a double ended deburring tool; and a primer pocket reamer.

2. The set of claim 1 which has a drill shank, to adapt to an electric drill, wherein the drill shank has an adapter end and a drill end, and the drill end and adapter end are both cylindrical in shape, and wherein the drill end is sized to be accepted in a chuck of a hand held drill, and wherein the adapter end is sized to slideably mate in the smaller cylindrical bore of the adapter barrel.

* * * * *